(12) United States Patent
Block et al.

(10) Patent No.: US 11,739,618 B2
(45) Date of Patent: Aug. 29, 2023

(54) PROCESSES FOR INCREASING HYDROCARBON PRODUCTION

(71) Applicant: Extract Management Company, LLC, Tulsa, OK (US)

(72) Inventors: Erik Block, Tulsa, OK (US); Mitchell Lee Crane, Tulsa, OK (US); David Zachariah, Tulsa, OK (US)

(73) Assignee: Extract Management Company, LLC, Tulsa, OK (US)

( * ) Notice: Subject to any disclaimer, the term of this patent is extended or adjusted under 35 U.S.C. 154(b) by 190 days.

(21) Appl. No.: 17/220,470

(22) Filed: Apr. 1, 2021

(65) Prior Publication Data

US 2021/0222529 A1 Jul. 22, 2021

Related U.S. Application Data

(63) Continuation-in-part of application No. 17/034,849, filed on Sep. 28, 2020, now abandoned, which is a (Continued)

(51) Int. Cl.
*E21B 43/12* (2006.01)
*F04D 25/06* (2006.01)
(Continued)

(52) U.S. Cl.
CPC ........ *E21B 43/128* (2013.01); *E21B 33/1275* (2013.01); *E21B 36/006* (2013.01); *E21B 41/0085* (2013.01); *E21B 43/12* (2013.01); *F04D 13/06* (2013.01); *F04D 25/0606* (2013.01); *F04D 25/0686* (2013.01); *F04D 29/041* (2013.01); *F04D 29/046* (2013.01); *F04D 29/5806* (2013.01); *F04D 29/586* (2013.01); *F16C 17/02* (2013.01); *F16C 17/04* (2013.01); *F16C 33/1065* (2013.01); *H02K 5/10* (2013.01); *H02K 5/132* (2013.01); *H02K 5/1677* (2013.01); *E21B 43/38* (2013.01); *F04D 1/06* (2013.01); *F04D 13/086* (2013.01); *F04D 13/10* (2013.01); *F04D 17/16* (2013.01); *F04D 29/061* (2013.01); *F04D 29/5866* (2013.01); *F16C 2360/00* (2013.01); *F16C 2360/44* (2013.01); *H02K 2205/03* (2013.01)

(58) Field of Classification Search
CPC ........ E21B 43/128; E21B 43/38; F04D 13/10; F04D 13/086
See application file for complete search history.

(56) References Cited

U.S. PATENT DOCUMENTS

| | | | |
|---|---|---|---|
| 8,448,699 B2 * | 5/2013 | Camilleri | F04B 47/06 166/54.1 |
| 9,127,774 B2 * | 9/2015 | Wilde | E21B 43/12 |

(Continued)

*Primary Examiner* — Jonathan Malikasim
(74) *Attorney, Agent, or Firm* — Hunton Andrews Kurth LLP

(57) ABSTRACT

Systems and methods for increasing hydrocarbon production using an electrical submersible pump are described. The methods typically include, for example, configuring an electrical submersible pump comprising a gas separator to induce a gas lift effect in a well comprising a tubing within a casing. Hydrocarbon production from the well is therefore increased using the electrical submersible pump.

19 Claims, 6 Drawing Sheets

Related U.S. Application Data continuation of application No. 16/780,089, filed on Feb. 3, 2020, now Pat. No. 10,822,933, which is a continuation of application No. 16/282,831, filed on Feb. 22, 2019, now Pat. No. 10,584,566.

(60) Provisional application No. 62/634,423, filed on Feb. 23, 2018.

(51) Int. Cl.

| | | |
|---|---|---|
| *F04D 29/58* | (2006.01) | |
| *F04D 13/06* | (2006.01) | |
| *F04D 29/046* | (2006.01) | |
| *F16C 17/02* | (2006.01) | |
| *F16C 33/10* | (2006.01) | |
| *H02K 5/132* | (2006.01) | |
| *H02K 5/167* | (2006.01) | |
| *H02K 5/10* | (2006.01) | |
| *F04D 29/041* | (2006.01) | |
| *E21B 33/127* | (2006.01) | |
| *E21B 36/00* | (2006.01) | |
| *E21B 41/00* | (2006.01) | |
| *F16C 17/04* | (2006.01) | |
| *F04D 29/06* | (2006.01) | |
| *F04D 17/16* | (2006.01) | |
| *F04D 13/10* | (2006.01) | |
| *F04D 13/08* | (2006.01) | |
| *E21B 43/38* | (2006.01) | |
| *F04D 1/06* | (2006.01) | |

(56) References Cited

U.S. PATENT DOCUMENTS

| | | | |
|---|---|---|---|
| 10,340,777 B2* | 7/2019 | Head | H02K 5/132 |
| 2008/0164034 A1* | 7/2008 | Uttley | E21B 43/122 |
| | | | 166/372 |
| 2019/0264553 A1* | 8/2019 | Garces | E21B 43/38 |
| 2020/0032637 A1* | 1/2020 | Saponja | E21B 43/38 |
| 2020/0362683 A1* | 11/2020 | El Mahbes | E21B 43/128 |

* cited by examiner

PROCESSES FOR INCREASING HYDROCARBON PRODUCTION

CROSS-REFERENCE TO RELATED APPLICATIONS

For U.S. purposes this application is a continuation-in-part of pending U.S. application Ser. No. 17/034,849 filed Sep. 28, 2020 which application is a continuation of Ser. No. 16/780,089 filed Feb. 3, 2020 which issued as U.S. Pat. No. 10,822,933 which application was a continuation of Ser. No. 16/282,831 filed Feb. 22, 2019 which issued as U.S. Pat. No. 10,584,566 which application claimed priority from provisional application No. 62/634,423 filed Feb. 23, 2018. All of the aforementioned applications are incorporated herein by reference.

FIELD OF THE DISCLOSURE

The present disclosure relates to systems and methods for increasing hydrocarbon production by, for example, inducing gas lift.

BACKGROUND AND SUMMARY

Hydrocarbon production from, for example, an oil and gas well, may often consume a large amount of energy and be limited in efficiency due to equipment limitations and/or other constraints. The present application is directed to processes and systems to improve the amount of energy, e.g., reduce the power required, and/or increase the production of a given well.

In one embodiment the application is directed a process for increasing hydrocarbon production using an electrical submersible pump. The process comprises configuring an electrical submersible pump comprising a gas separator to induce a gas lift effect in a well. The well comprises a central tubing within a casing such that an annulus is formed between the central tubing and the casing. Hydrocarbons may be produced from the well with the electrical submersible pump such that reservoir fluid is produced up the central tubing and a mixture comprising reservoir gas and reservoir fluid is produced up the annulus.

In another embodiment the application is directed to a system for increasing hydrocarbon production using an electrical submersible pump. The system comprises a well with at least a central tubing within a casing. The central tubing comprises a fluid exit opening near a surface of the well and a fluid entrance opening downhole. An electrical submersible pump may be suspended from the fluid entrance opening of the central tubing. The electrical submersible pump comprises a pump operably connected to the fluid entrance opening of the central tubing, a gas separator operably connected to the pump, and a motor operably connected to the gas separator. The system is configured to produce reservoir fluid up the central tubing and to produce a mixture comprising reservoir fluid and reservoir gas up an annulus between the central tubing and the casing. The system is also configured to induce a gas lift effect in the absence of injecting gas into the well from the surface.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

The following description of embodiments provides a non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The systems and methods disclosed herein generally relate to systems and methods for increasing hydrocarbon production from a well by, for example, inducing gas lift and then producing hydrocarbons from the well with an electrical submersible. That is, a process for increasing hydrocarbon production may be employed that uses an electrical submersible pump. The specific electrical submersible pump is not particularly critical and may be any conventional electrical submersible pump known in the art. Particularly suitable electrical submersible pumps are those employing a gas separator such as those described in, for example, U.S. Pat. No. 10,822,933 which is incorporated by reference. The electrical submersible pumps used herein may comprise a pump module, a motor such as a permanent magnet motor, and a gas separator between the pump module and motor.

As is known in the art, typical wells comprise a central tubing within a casing. Advantageously, the processes and systems used herein may induce gas lift in the absence of injecting gas into the well from the surface simply by configuring the electrical submersible pump within the well as described herein. Of course, injecting gas into the well from the surface may further induce gas lift.

Configuring the electrical submersible pump within the well may be accomplished in any convenient manner so long as the desired gas lift effect is achieved. In some cases the configuring step may comprise suspending the electrical submersible pump from the central tubing such that reservoir fluid is produced up the central tubing and a mixture comprising reservoir gas and reservoir fluid is produced up the annulus. As used herein reservoir gas may comprise a hydrocarbon, carbon dioxide, other gases, and mixtures thereof. The present methods and systems are typically employed to induce gas lift without injecting gas into the well from the surface. However, if gas has been previously injected, then it may also form a portion of reservoir gas.

Figure 1A:
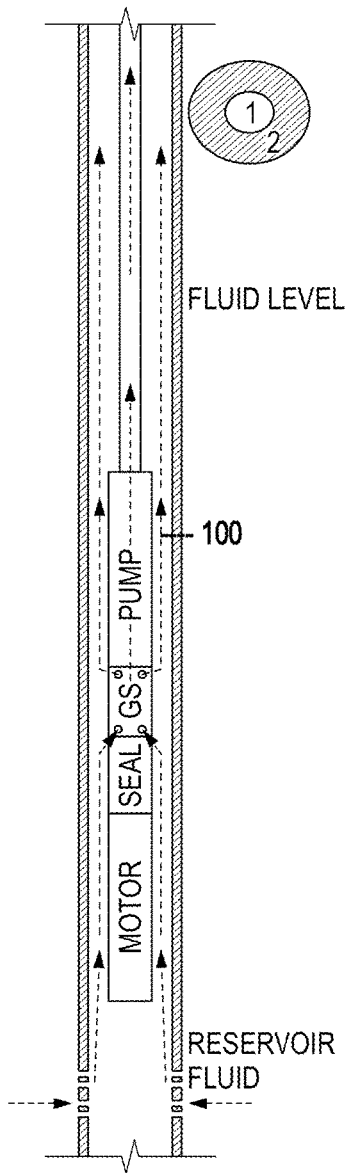
FIG. 1A depicts an ESP installation using an annulus between the central tubing and casing as a second fluid production flow path.
Figure 1B:
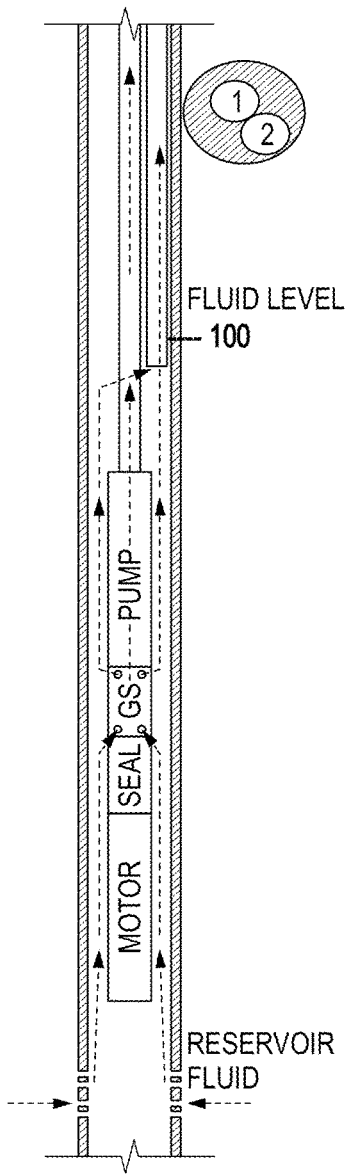
FIG. 1B depicts an ESP installation using a second tubing string as an additional fluid production flow path.
Figure 1C:
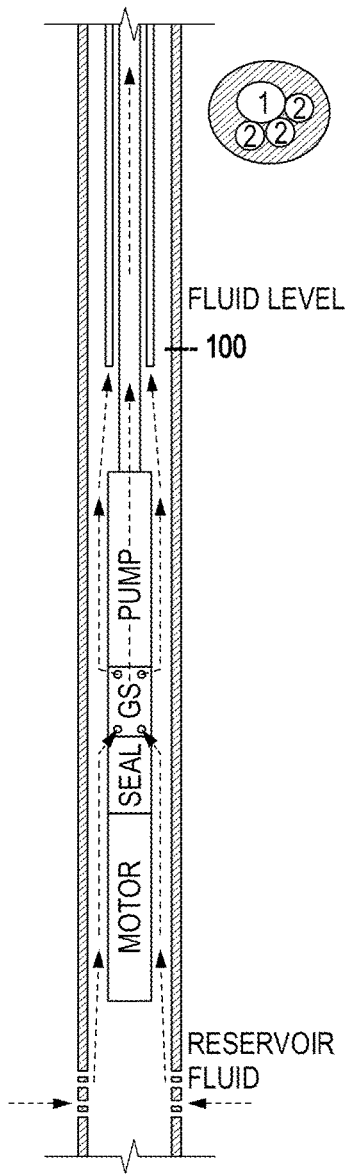
FIG. 1C depicts an ESP installation using three tubing strings as additional fluid production flow paths.
Figure 6:
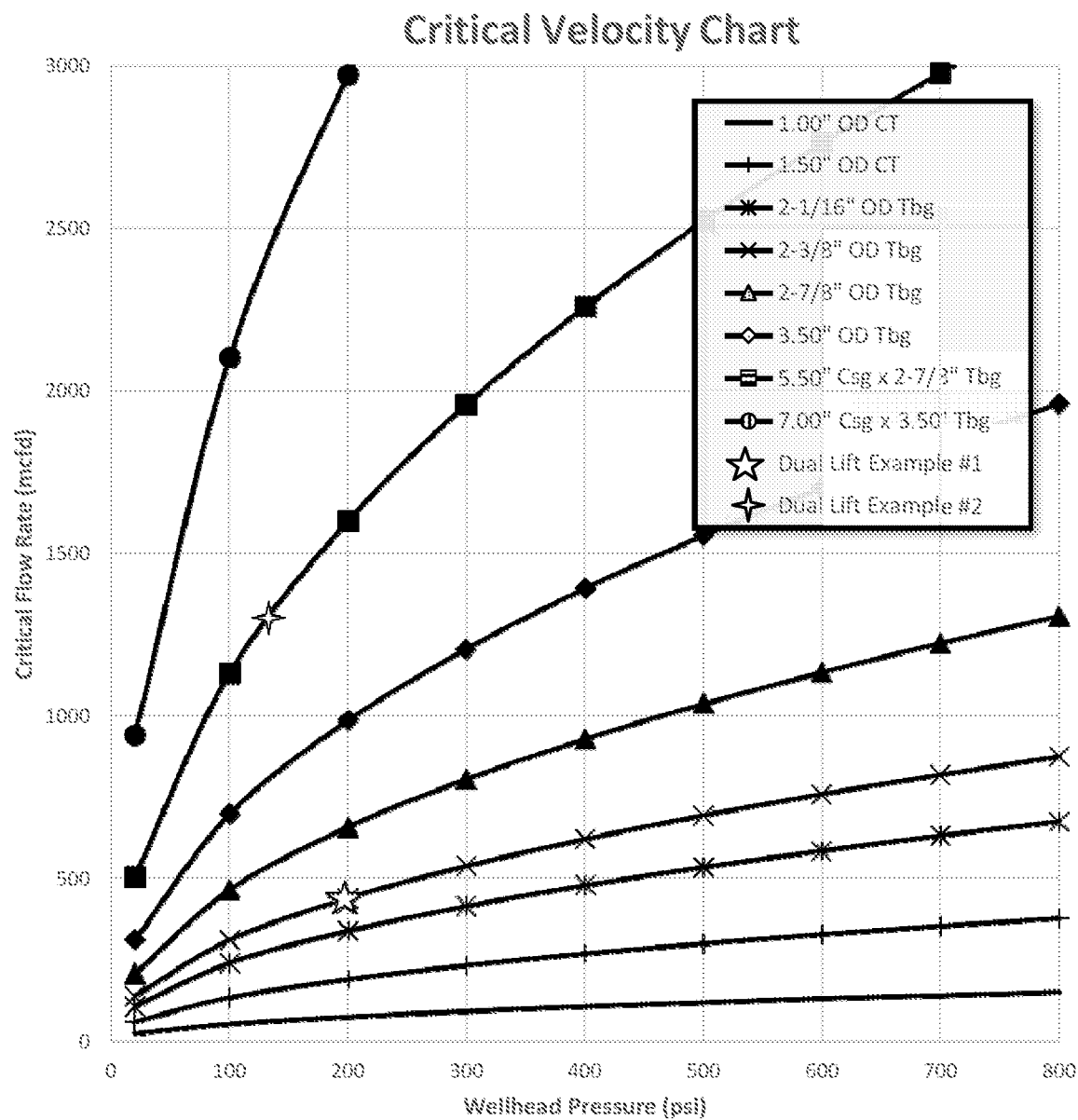
FIG. 6 shows critical velocities as related to wellhead pressure and flow rate.

The configuring step may comprise suspending the electrical submersible pump from the central tubing such that velocity of a gas separated by the gas separator is preferably above a critical velocity for the well. Critical velocity may vary depending upon such factors as cross-sectional flow area, wellhead pressure, and the like as shown in FIG. 6. Thus, to achieve a condition where the velocity of gas separated by the gas separator is above a critical velocity the critical velocity may somehow be reduced and/or a velocity of the gas separated by the gas separator may be increased. Generally, it has been discovered that this may accomplished by configuring the respective geometries (such as shown in FIGS. 1A-1C) within the pump to overcome and/or ensure the gas velocity is at equal to or above the critical velocity of reservoir fluid. In this manner the velocity of gas up the annulus (with or without added tubing strings) is sufficient to lift reservoir fluid up the annulus with the gas (which annulus may have one or more additional tubing strings within it). It has been discovered that critical velocity is related to, for example, a cross-sectional area of clearance between a central tubing (and the sum of any additional tubing strings), if employed, as well as perhaps wellhead pressure and to a lesser extent perhaps density of any reservoir fluid.

In some embodiments the gas lift effect herein is advantageously induced in the absence of injecting gas into the well from the surface. That is, a clearance between the central tubing (including any additional tubing strings) and the casing is sufficient to achieve and/or induce a desired gas lift effect. This may be accomplished in many different manners depending upon the specific electrical submersible pump, casing, tubing, and other parameters. In some embodiments it has been found that the pump, casing, central tubing and, if present, any additional tubing strings, should be configured such that the casing clearance wherein the pump is suspended is less than about 30%, or less than about 25%, or less than about 20%, or less than about 18%, or less than about 15%, or less than about 10%, or less than about 8% of the casing diameter. In the cases wherein one or more additional tubing strings are employed into the annulus that extend at least from a surface into the well and terminate uphole from the electrical submersible pump, then the sum of diameters of the central tubing and the one or more additional tubing strings is usually less than about 30% less, or than about 25%, or less than about 20%, or less than about 18%, or less than about 15%, or less than about 10%, or less than about 8% of the casing diameter uphole from the electrical submersible pump. In this manner, at least a portion of the mixture comprising reservoir gas and reservoir fluid produced up the annulus may pass through, if present, the one or more, e.g., two, three, or four or more additional tubing strings. It is not particularly critical where any additional tubing strings that extend into the annulus terminate so long as they terminate uphole of the electrical submersible pump as shown in FIGS. 1B and 1C. In some embodiments, it may be desirable to have the additional tubing terminate uphole and close to the electrical submersible pump, e.g., within 500 feet, or within 400 feet, or within 300 feet, or within 200 feet, or within 100 feet, or within 50 feet, or even closer depending upon the well configuration and parameters.

While not wishing to be bound to any particular theory it is believed that the "tighter" configuration, for example, less than about 30% clearance described above, facilitates gas lift up the annulus which may include one or more 2nd flow paths which flow paths may be the annulus between the central tubing and casing and, of course, may also include any one or more tubing strings within the annulus. That is, in some cases the annulus between the central tubing and the casing may include a second, and/or third and/or fourth or more tubing strings.

Advantageously, a desired tighter clearance may be accomplished in a number of ways. For example, as shown in FIG. 1A, the desired casing clearance 100 may be configured by selecting the pump diameter at an appropriate location, e.g., at or above the ESP gas separator in this instance, such that flow path 2 in FIG. 1A (the annulus between the tubing and casing) adjacent the pump is within the desired casing clearances described above. Alternatively or additionally, desired casing clearances may be accomplished by employing additional tubing strings, e.g., one, or two, or three or more additional tubing strings. FIG. 1B shows the casing clearance 100 configured for the desired tighter fit in the region of a second tubing which creates at least one flow path 2 for enhancing gas lift.

FIG. 1C shows a casing clearance 100 configured for the desired tighter fit in the region of a second, third, and/or fourth or more tubing which creates additional flow paths 2 or more for enhancing gas lift. In the case of adding a second, third, and/or a fourth or more tubing string each tubing string may be of the same diameter in cross-section and length and/or of different diameters and lengths so long as the desired gas lift effect is achieved due to the casing clearance and/or annulus describe above. In some specific embodiments the second, third, and/or a fourth tubing string are uphole from the pump and up to all of the tubing strings may be smaller in cross-section than the central tubing from which the pump is suspended. In most circumstances hydrocarbon fluids are produced up the tubing on which the pump is suspended while reservoir fluid, reservoir gas, and mixtures thereof are produced up the annulus between the tubing and the casing which annulus may include the one or more added tubing strings such as those shown in FIGS. 1B and 1C.

Advantageously, using the configurations described herein hydrocarbons produced from the well may be at least about 3%, or at least 5%, or at least 10%, or at least 20%, or more than a comparable process without the configuring step as shown in the data below. Similarly, horsepower or energy consumed for the production process may be diminished by at least 5%, or at least 10%, or at least 20% or more than a comparable process without the configuring step or other methods and systems described herein. In some embodiments, hydrocarbons produced from a well configured as described herein may be about the same or more than a comparable process without the configuring step wherein the comparable process uses more horsepower over the time of a given ESP run.

The table below shows representative casing and tubing sizes that may be employed in combination to induce gas lift. The casing clearance as a percent of the casing diameter is shown in the "clearance" column.

| Casing | | Tubing | | Clearance | |
|---|---|---|---|---|---|
| Size | ID (in) | Size | OD (in) | (in) | (% of Dc) |
| 7.000" 26.00 ppf | 6.276 | 3.500" 9.30 ppf | 3.500 | 1.3880 | 22.1% |
| 7.000" 26.00 ppf | 6.276 | 2.875" 6.50 ppf | 2.875 | 1.7005 | 27.1% |
| 5.500" 17.00 ppf | 4.892 | 2.875" 6.50 ppf | 2.875 | 1.0085 | 20.6% |
| 5.500" 17.00 ppf | 4.892 | 2.375" 4.70 ppf | 2.375 | 1.2585 | 25.7% |
| 5.000" 15.00 ppf | 4.408 | 2.375" 4.70 ppf | 2.375 | 1.0165 | 23.1% |

Example 1

The methods described above are employed on a well with the parameters shown in the table below.

| Well Parameters | |
|---|---|
| Perf Datum: | 11,300' TVD |
| Kick Off Point: | 10,850' TVD |
| Casing: | 7.000" 20 ppff |
| ESP Tubing: | 2.875" 6.5 ppf |
| Dual Lift Tubing: | 2.375" 4.7 ppf |
| Est. Reservoir Pressure: | 5400 PSI |
| ESP Description: | 528 stages of 3000 Barrels Per Day pump stage |

| Well Productivity Test | |
|---|---|
| WH Pressure: | 800 PSI |
| Oil Rate: | 875 BPD |
| Water Rate: | 1105 BPD |
| Gas Rate: | 1000 MCF |
| Test BH Flowing Pressure: | 3900 PSI |

Potential horsepower savings using the methods described herein on the well described above is shown below.

| Dual Lift Example-HP Savings Projection | | | | | | | | | |
|---|---|---|---|---|---|---|---|---|---|
| Est. Reservoir Pressure | Total Fluid Prod | Total Gas Prod | PIP | Gas Takeaway- Dual Lift String | Fluid Takeaway- Dual Lift String | Power Requirements- ESP Only | | Power Requirements- Dual Lift | | HP Reduction |
| (PSI) | (BPD) | (MCFD) | (PSI) | (MCFD) | (%) | (Freq) | (HP) | (Freq) | (HP) | % |
| 5400 | 3000 | 1650 | 2650 | 165 | 0 | 57 | 225 | 57 | 225 | 0 |
| 4600 | 3000 | 1800 | 1800 | 774 | 20 | 63 | 311 | 56 | 221 | 29 |
| 4000 | 2500 | 1750 | 1350 | 1050 | 12 | 62 | 300 | 58 | 244 | 19 |
| 3000 | 2000 | 1400 | 1000 | 840 | 5 | 60 | 269 | 59 | 254 | 6 |
| 2200 | 1500 | 1050 | 680 | 840 | 4 | 59 | 249 | 59 | 249 | 0 |
| 1700 | 1000 | 700 | 640 | 560 | 3 | 56 | 211 | 56 | 206 | 2 |

Potential production increase using the methods described herein on the well described above is shown below.

| Dual Lift Example-Production Uplift | | | | | | | | |
|---|---|---|---|---|---|---|---|---|
| Est. Reservoir Pressure | Total Fluid Prod- ESP Only | Total Fluid Prod- Dual Lift | Total Gas Prod | PIP | Gas Takeaway- Dual Lift String | ESP Power Requirements | | Production Uplift |
| (PSI) | (BPD) | (BPD) | (MCFD) | (PSI) | (MCFD) | (Freq) | (HP) | % |
| 5400 | 3000 | 3000 | 1650 | 2650 | 165 | 57 | 225 | 0 |
| 5200 | 3000 | 3600 | 2160 | 1800 | 929 | 63 | 311 | 20 |
| 4100 | 2500 | 2800 | 1960 | 1350 | 1176 | 62 | 300 | 12 |
| 3100 | 2000 | 2100 | 1470 | 1000 | 882 | 60 | 269 | 5 |
| 2400 | 1500 | 1560 | 1092 | 680 | 874 | 59 | 249 | 4 |
| 1700 | 1000 | 1030 | 721 | 640 | 577 | 56 | 211 | 3 |

Figure 2:
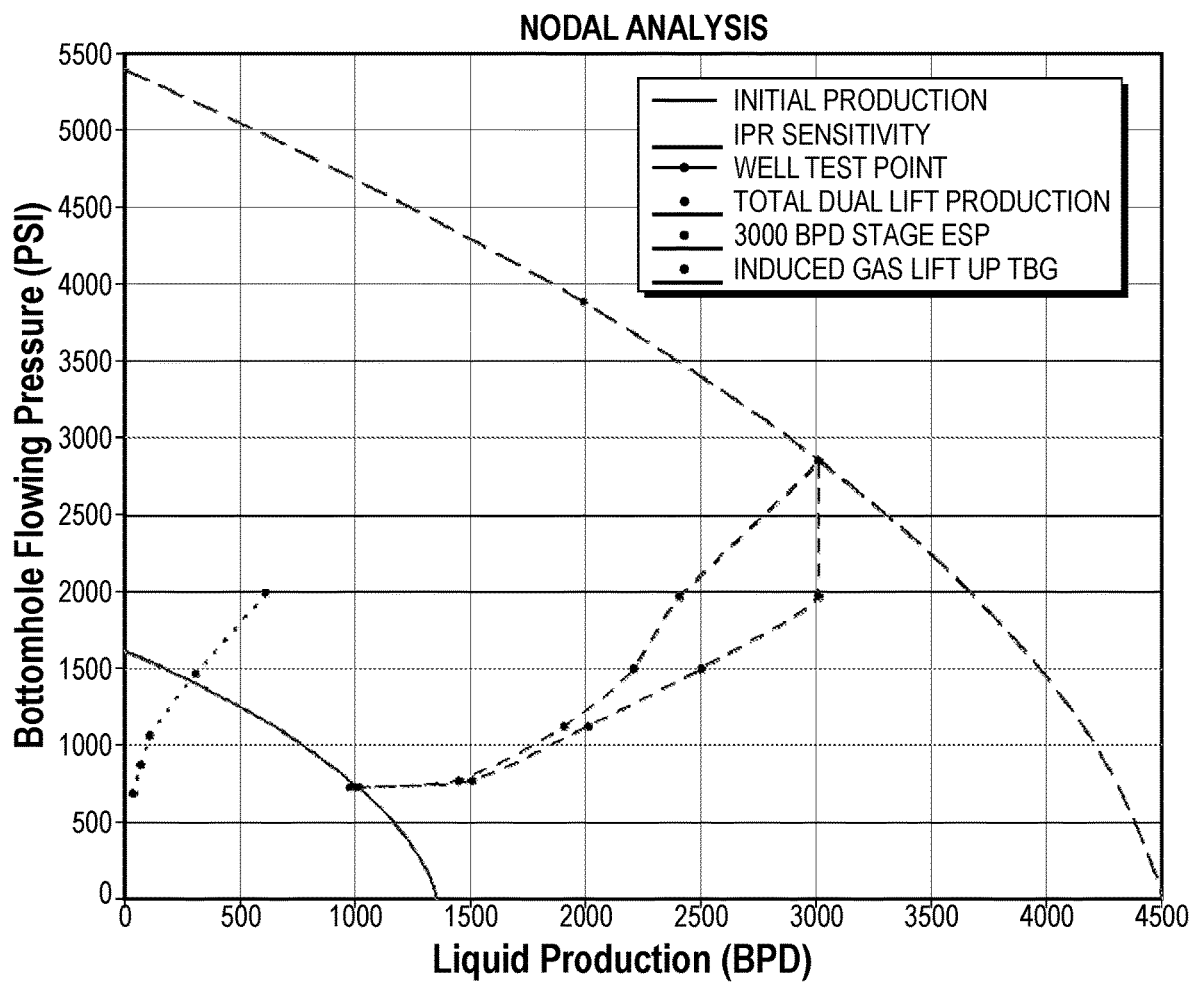
FIG. 2 depicts a nodal analysis comparing conventional production methods vs. the methods described herein.
Figure 3:
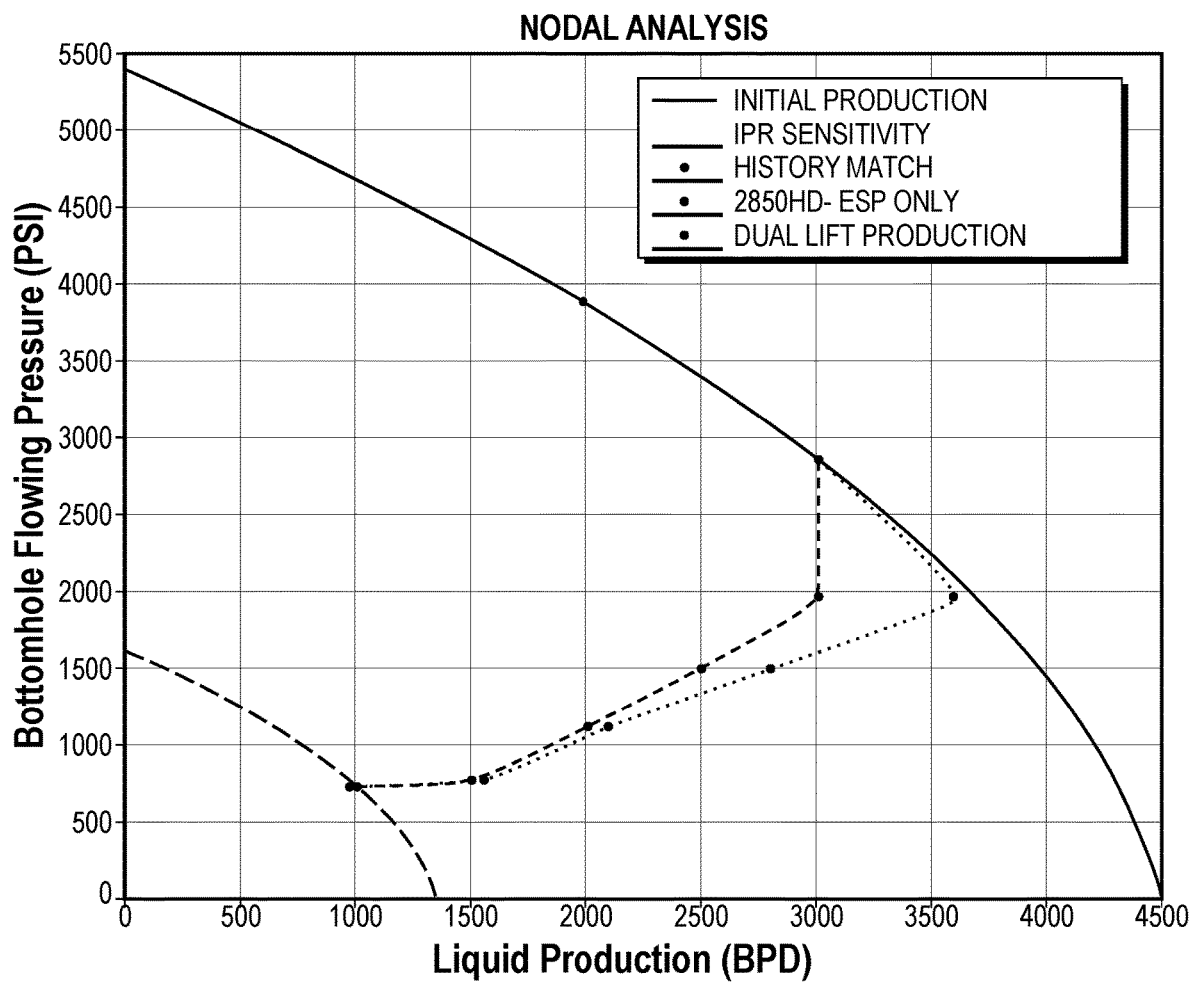
FIG. 3 depicts a second nodal analysis comparing conventional production methods vs. the methods described herein

FIGS. 2 and 3 show a nodal analysis comparing conventional production methods vs. the methods described herein. As shown in FIG. 2 employing the methods and systems described herein may result in reduced energy requirements while FIG. 3 shows employing the methods and systems described herein may additionally or alternative result in increased production.

Example 2

The methods described above are employed on a well with the parameters shown in the table below.

| Well Parameters | |
| --- | --- |
| Perf Datum: | 9,950' TVD |
| Kick Off Point: | 9,250' TVD |
| Casing: | 5.500" 23 ppff |
| ESP Tubing: | 2.875" 6.5 ppf |
| Dual Lift Takeaway: | 5.5" × 2.875" Annulus |
| Est. Reservoir Pressure: | 4000 PSI |
| ESP Description: | 268 stages of 4000 Barrels Per Day |

| Well Productivity Test | |
| --- | --- |
| WH Pressure: | 400 PSI |
| Oil Rate: | 600 BPD |
| Water Rate: | 3400 BPD |
| Gas Rate: | 1500 MCF |
| Test BH Flowing Pressure: | 2800 PSI |

Potential horsepower savings using the methods described herein on the well described above is shown below.

| PIP | Gas Takeaway-Duel Lift String | Fluid Takeaway-Dual Lift String | Power Requirements-ESP Only | | Power Requirements-Dual Lift | | HP Reduction |
| --- | --- | --- | --- | --- | --- | --- | --- |
| (PSI) | (MCFD) | (%) | (Freq) | (HP) | (Freq) | (HP) | % |
| 2170 | 1350 | 53 | 60 | 258 | 40 | 68 | 74 |
| 1700 | 1440 | 44 | 63 | 296 | 50 | 125 | 58 |
| 1540 | 1440 | 41 | 60 | 249 | 53 | 143 | 43 |
| 1400 | 1440 | 39 | 60 | 246 | 54 | 143 | 42 |
| 1100 | 1260 | 23 | 62 | 249 | 61 | 201 | 19 |
| 850 | 1080 | 13 | 65 | 249 | 65 | 241 | 3 |

Potential production increase using the methods described herein on the well described above is shown below.

| Est. Reservoir Pressure | Total Fluid Prod-ESP Only | Total Fluid Prod-Dual Lift | Total Gas Prod | PIP | Gas Takeaway-Dual Lift String | ESP Power Requirements | | Production Uplift |
| --- | --- | --- | --- | --- | --- | --- | --- | --- |
| (PSI) | (BPD) | (BPD) | (MCFD) | (PSI) | (MCFD) | (Freq) | (HP) | % |
| 4000 | 4000 | 5200 | 2300 | 1700 | 2070 | 63 | 296 | 30 |
| 3800 | 3800 | 4500 | 2250 | 1540 | 2025 | 61 | 250 | 18 |
| 3400 | 3400 | 3900 | 2200 | 1400 | 1980 | 60 | 250 | 15 |
| 2600 | 2600 | 2950 | 1700 | 1100 | 1530 | 61 | 250 | 13 |
| 2000 | 2050 | 2250 | 1700 | 850 | 1530 | 63 | 250 | 10 |

Figure 4:
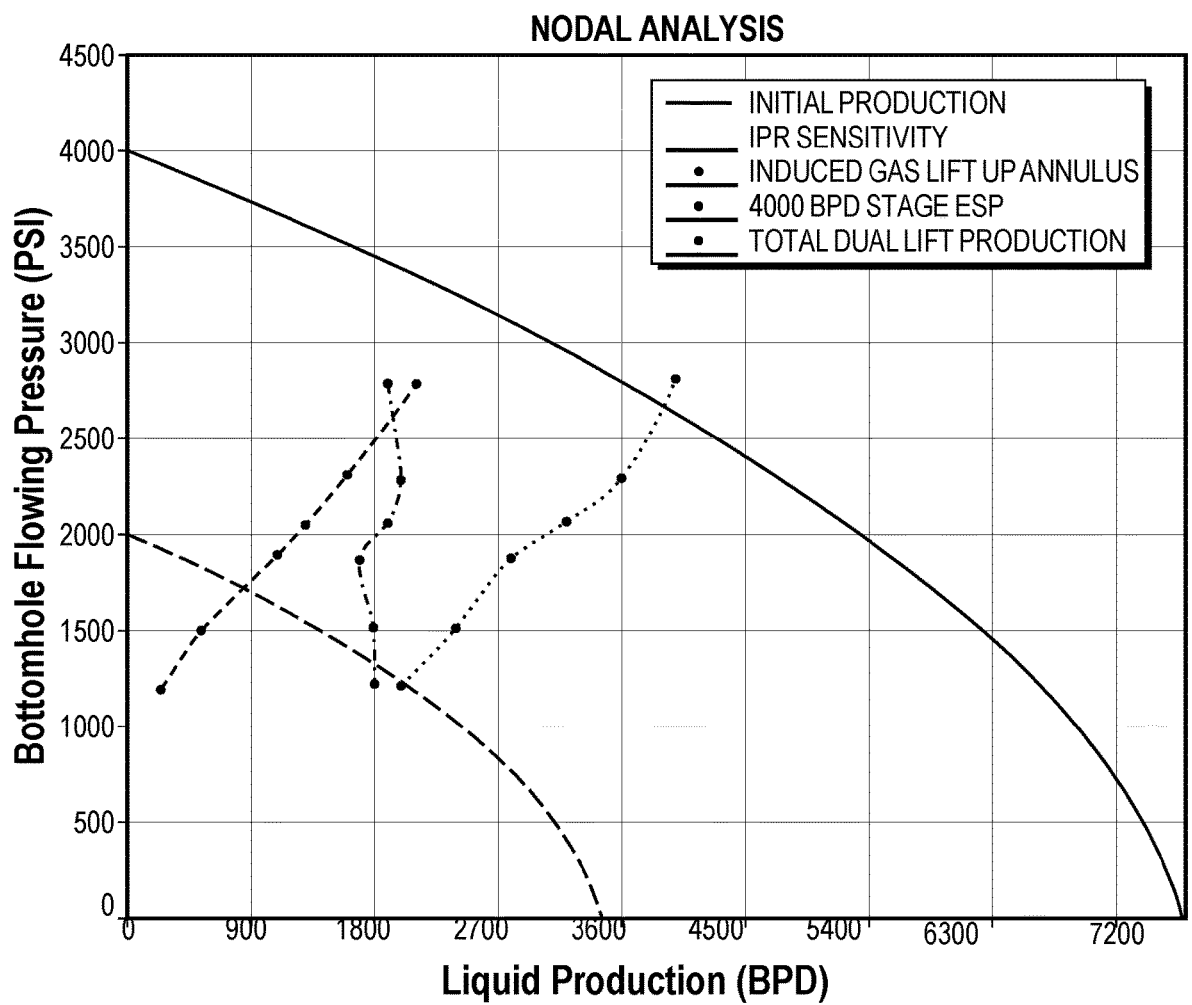
FIG. 4 depicts a third nodal analysis comparing conventional production methods vs. the methods described herein.
Figure 5:
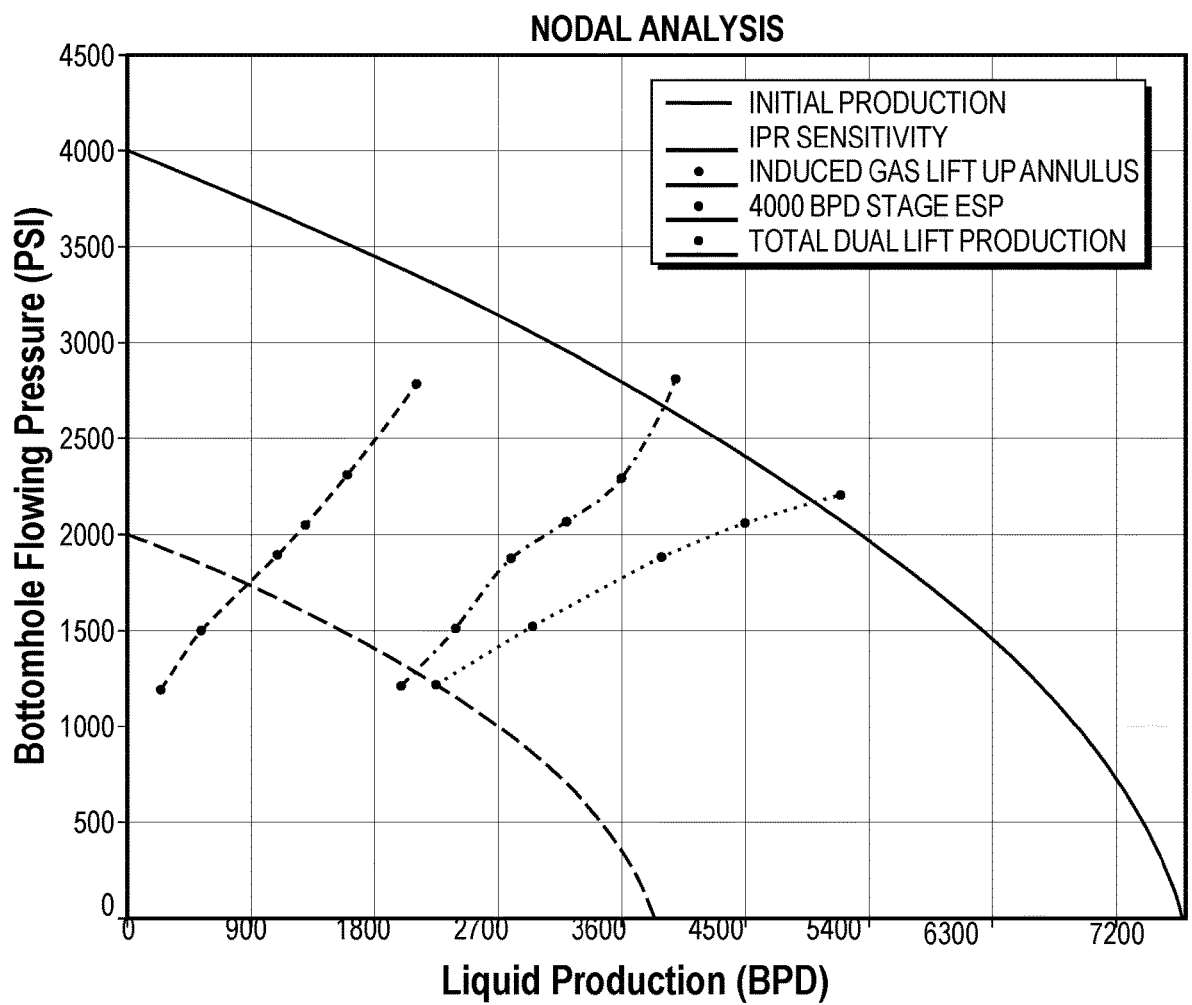
FIG. 5 depicts a fourth nodal analysis comparing conventional production methods vs. the methods described herein.

FIGS. 4 and 5 show a nodal analysis comparing conventional production methods vs. the methods described herein. As shown in FIG. 4 employing the methods and systems described herein may result in reduced energy requirements while FIG. 5 shows employing the methods and systems described herein may additionally or alternative result in increased production.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A process for increasing hydrocarbon production using an electrical submersible pump comprising:
   configuring an electrical submersible pump comprising a gas separator to induce a gas lift effect in a well wherein the well comprises a central tubing within a casing such that an annulus is formed between the central tubing and the casing; and
   producing hydrocarbons from the well with the electrical submersible pump such that reservoir fluid is produced up the central tubing and a mixture comprising reservoir gas and reservoir fluid is produced up the annulus,
   wherein the configuring step comprises suspending the electrical submersible pump from the central tubing such that velocity of a gas separated by the gas separator is above a critical velocity of reservoir fluid from the well.

2. The process of claim 1 wherein the gas lift effect is induced in the absence of injecting gas into the well from the surface.

3. The process of claim 1 wherein the configuring step comprises suspending the electrical submersible pump from the central tubing such that the central tubing within the casing comprises a casing clearance which is less than about 30% of the casing diameter uphole from the electrical submersible pump.

4. The process of claim 3, wherein the hydrocarbons produced from the well wherein the casing clearance is less than about 30% of the casing diameter uphole from the electrical submersible pump are at least 5% up to 20% than a process without said casing clearance of less than about 30% of the casing diameter uphole from the electrical submersible pump.

5. The process of claim 3, wherein the hydrocarbons produced from the well wherein the casing clearance is less than about 30% of the casing diameter uphole from the electrical submersible pump are about the same or more than a process without said casing clearance of less than about 30% of the casing diameter uphole from the electrical submersible pump and wherein the process uses at least 6% up to 29% horsepower over the time of a given electrical submersible pump (ESP) run.

6. The process of claim 1 wherein the configuring step comprises suspending the electrical submersible pump from the central tubing such that the central tubing within the casing comprises a casing clearance which is less than about 20% of the casing diameter uphole from the electrical submersible pump.

7. The process of claim 1 wherein the configuring step comprises suspending the electrical submersible pump from the central tubing and employing one or more additional tubing strings into the annulus that extend at least from a surface into the well and terminate uphole from the electrical submersible pump wherein the sum of diameters of the central tubing and the one or more additional tubing strings is less than about 30% of the casing diameter uphole from the electrical submersible pump.

8. The process of claim 7 wherein the mixture comprising reservoir gas and reservoir fluid is produced up the annulus wherein at least a portion of the mixture comprising reservoir gas and reservoir fluid produced up the annulus passes through the one or more additional tubing strings.

9. The process of claim 7 wherein the one or more additional tubing strings comprise a smaller diameter than the central tubing.

10. The process of claim 1 wherein the configuring step comprises suspending the electrical submersible pump from the central tubing and employing one or more additional tubing strings into the annulus that extend at least from a surface into the well and terminate uphole from the electrical submersible pump wherein the sum of diameters of the central tubing and the one or more additional tubing strings is less than about 30% of the casing diameter uphole from the electrical submersible pump.

11. The process of claim 1 wherein the separation efficiency of the gas separator is from about 60 to about 100%.

12. The process of claim 1 wherein the electrical submersible pump has an intake pressure below the bubble point of the reservoir.

13. The process of claim 1, wherein critical velocity of reservoir fluid varies depending upon cross-sectional flow area, or wellhead pressure.

14. A system for increasing hydrocarbon production using an electrical submersible pump comprising:
a well comprising a central tubing within a casing wherein the central tubing comprises a fluid exit opening near a surface of the well and a fluid entrance opening downhole;
an electrical submersible pump suspended from the fluid entrance opening of the central tubing;
wherein the electrical submersible pump comprises a pump operably connected to the fluid entrance opening of the central tubing, a gas separator operably connected to the pump, and a motor operably connected to the gas separator;
wherein the system is configured to produce reservoir fluid up the central tubing and to produce a mixture comprising reservoir fluid and reservoir gas up an annulus between the central tubing and the casing;
wherein the system is configured to induce a gas lift effect in the absence of injecting gas into the well from the surface
by suspending the electrical submersible pump from the central tubing such that velocity of a gas separated by the gas separator is above a critical velocity of reservoir fluid from the well.

15. The system of claim 14 which further comprises: one or more tubing strings uphole from the electrical submersible pump wherein the one or more tubing strings are in the annulus between the casing and the central tubing wherein the one or more tubing strings are configured to produce a mixture comprising reservoir fluid and reservoir gas up the annulus through the one or more tubing strings.

16. The system of claim 15, wherein at least one tubing string is smaller in cross-section than the central tubing.

17. The system of claim 14, wherein the central tubing within the casing comprises a casing clearance which is less than about 30% of the casing diameter uphole from the electrical submersible pump.

18. The system of claim 14, wherein the central tubing within the casing comprises a casing clearance which is less than about 30% of the casing diameter uphole from the electrical submersible pump.

19. The system of claim 14, wherein critical velocity of reservoir fluid varies depending upon cross-sectional flow area, or wellhead pressure.

* * * * *